United States Patent [19]

Young

[11] Patent Number: 5,494,498
[45] Date of Patent: Feb. 27, 1996

[54] METHODS FOR USING CONCENTRATED NITROGEN-CONTAINING FERTILIZERS

[75] Inventor: Donald C. Young, Fullerton, Calif.

[73] Assignee: Union Oil Company of California, Los Angeles, Calif.

[21] Appl. No.: 399,672

[22] Filed: Mar. 7, 1995

Related U.S. Application Data

[62] Division of Ser. No. 28,378, Mar. 9, 1993, Pat. No. 5,417, 737.

[51] Int. Cl.$^6$ .......................................... C05C 9/00
[52] U.S. Cl. .................... 71/30; 71/29; 564/63
[58] Field of Search .................... 71/28, 30, 53, 71/54; 564/63

[56] References Cited

U.S. PATENT DOCUMENTS 1,916,617  7/1933  Jaenecke et al. ......................... 71/28

FOREIGN PATENT DOCUMENTS 0274374  4/1991  Czechoslovakia .

OTHER PUBLICATIONS

Seidell et al., *Solubilities of Inorganic and Organic Compounds,* Van Nostrand Co., New York, NY (1952), p. 124.
Sienko & Plane, "Chemistry," (1961), pp. 196–199.
*Fertilizer Nitrogen, Its Chemistry and Technology,* Sauchelli, Editor, Reinhold Publ. Corp. NY (1964) pp. 251, 347–350.
Millard, *Physical Chemistry For Colleges,* McGraw-Hill Book Co. Inc., NY (1953) pp. 191–292.
CA 129779W, "Solubilities Equilibrium System," Kuemmel et al., Z Chem. (1973) 13(6), pp. 232–233. (No Month).

*Primary Examiner*—Ferris Lander
*Attorney, Agent, or Firm*—Gregory F. Wirzbicki; Shlomo R. Frieman

[57] ABSTRACT

Urea increases the solute content of a fertilizer comprising water and at least two different nitrate-containing compounds selected from the group consisting of ammonium nitrate, alkali metal nitrates, and alkaline earth metal nitrates. In addition, urea enhances plant uptake of alkaline earth metals. Particularly favored are quaternary aqueous solutions containing urea, calcium nitrate, and ammonium nitrate.

15 Claims, 1 Drawing Sheet

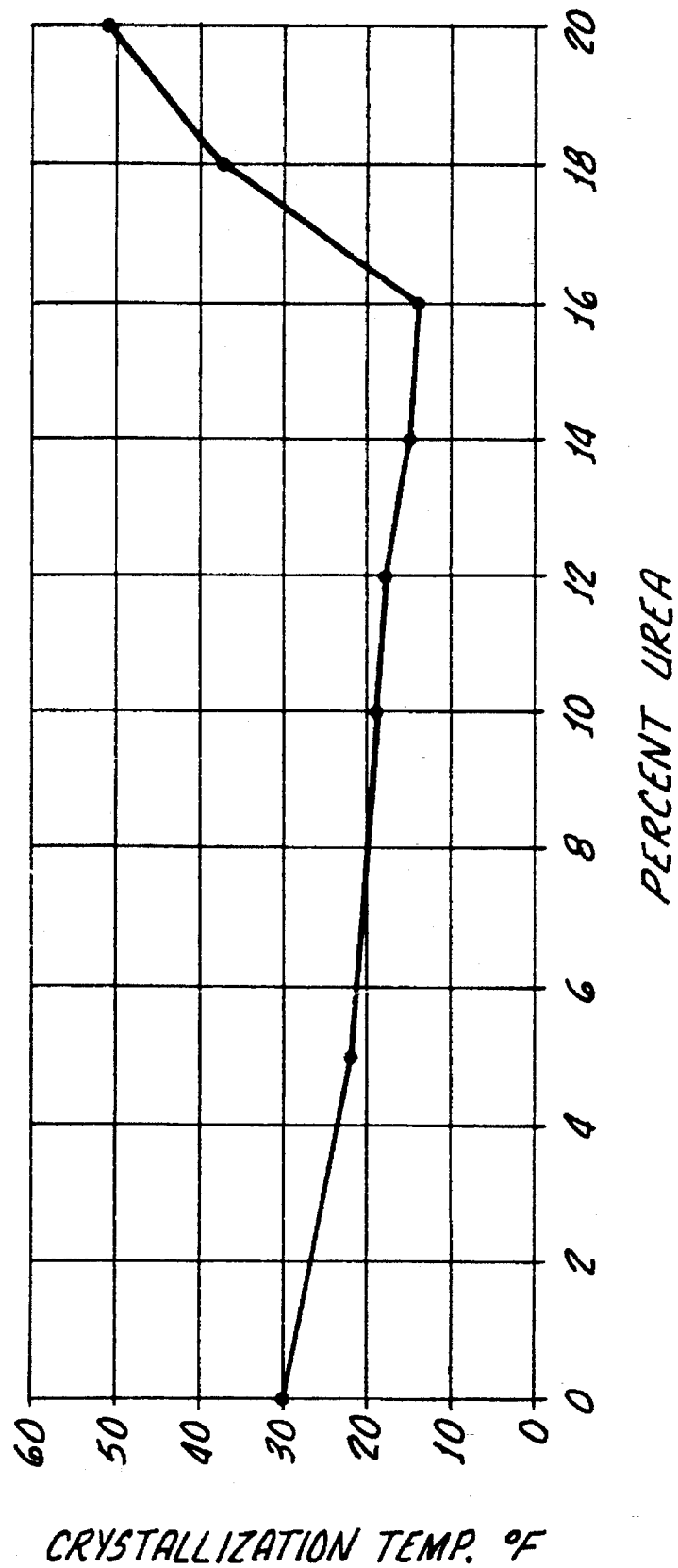

METHODS FOR USING CONCENTRATED NITROGEN-CONTAINING FERTILIZERS

This application is a division, of application Ser. No. 08/028,378, filed Mar. 9, 1993 now U.S. Pat. No. 5,417,737.

BACKGROUND

The present invention relates to (a) nitrogen-containing fertilizers, (b) methods for increasing alkaline earth metal uptake by plants, (c) methods for fertilizing plants, and (c) methods for manufacturing nitrogen-containing fertilizers.

Many plants need supplemental calcium for nutrition and disease prevention. However, plants have difficulty absorbing added calcium unless it is combined with one or more nitrogen compounds.

A material currently being used in agricultural practice is a ternary aqueous solution comprising calcium nitrate and ammonium nitrate in a binary eutectic ratio. The ternary solution contains a mole ratio of ammonium nitrate to calcium nitrate of about 1.75. The maximum solution concentration that can be prepared from the ternary solution, while maintaining the crystallization temperature of the solution above or at about −1.1° C. (about 30° F.), is about 30.9 weight percent ammonium nitrate, about 36.2 weight percent calcium nitrate, and about 32.9 weight percent water-for a total nitrogen content of about 17 weight percent. (As used in the specification and claims, the term "crystallization temperature" means the temperature at which crystals begin to form in an aqueous solution as the temperature of the aqueous solution is lowered; and the term "weight percent" means the weight of a particular ingredient present in a solution divided by the total weight of all solubilized solutes and solvents present in the solution, the quotient being multiplied by 100%.)

SUMMARY OF THE INVENTION

In order to increase agronomic profitability, there is a need to further increase the efficiency of plants to absorb calcium. In addition, there is a need to increase the nitrogen concentration of nitrogen-containing fertilizers, thereby lowering costs by decreasing the amount of fertilizer applied per unit area of land for any given nitrogen application rate.

The present invention satisfies both needs by providing aqueous solutions comprising urea and at least two nitrate-containing compounds. (As used in the specification and claims, the term "nitrate-containing compounds" means compounds selected from the group consisting of ammonium nitrate, alkali metal nitrates, alkaline earth metal nitrates, and mixtures thereof.) Preferably, the composition of the present invention is a quaternary aqueous solution comprising ammonium nitrate, calcium nitrate, and urea, with it being even more preferred that the ammonium nitrate, calcium nitrate, and urea be present in a ternary eutectic ratio. The quaternary solution can be formulated to contain a higher total nitrogen content, while maintaining the crystallization temperature of the solution at or below about −1.1° C. (about 30° F.). For example, the most preferred quaternary solution of the present invention has a crystallization temperature of about −1.1° C. (about 30° F.) and contains about 25.5 weight percent ammonium nitrate, about 30 weight percent calcium nitrate, about 17.2 weight percent urea, and about 27.3 weight percent water. Accordingly, the total nitrogen content of this preferred quaternary solution is about 22 weight percent-an increase of about 30 percent over the prior art ternary solution. Because the quaternary solution has a higher nitrogen concentration than the ternary solution, a smaller amount of the quaternary solution is required to be applied per unit area for a given nitrogen application rate. In addition, as demonstrated hereinafter in Example 2, substantially more calcium is absorbed by a plant from the urea-containing solution of the present invention than from a solution devoid of urea.

DRAWING

The increased calcium uptake by plants and the increased nitrogen content of aqueous fertilizer solutions, as well as other features, aspects, and advantages of the invention will become better understood with reference to the following description, appended claims, and accompanying drawing wherein the sole Figure is a graphical plot of crystallization temperature versus urea concentration. The data plotted in the Figure were obtained from an experiment (described in Example 1, hereinafter) which entailed adding incremental amounts of urea to a ternary aqueous solution containing ammonium nitrate and calcium nitrate in an eutectic ratio and observing the crystallization temperature of the resulting quaternary solutions.

DETAILED DESCRIPTION OF THE INVENTION

The fertilizer of the present invention is an aqueous solution comprising urea and at least two nitrate-containing compounds. Preferably, the nitrate-containing compounds are selected from the group consisting of ammonium nitrate, sodium nitrate, potassium nitrate, magnesium nitrate, and calcium nitrate, with ammonium nitrate and calcium nitrate being preferred. The total concentration of the nitrate-containing compounds in the composition of the present invention are generally less than about 75 weight percent. More commonly, the total concentration of the nitrate-containing compounds in the composition of the present invention is about 40 to about 70, e.g., about 45 to about 65, and preferably about 50 to about 60, weight percent.

In a quaternary aqueous solution comprising ammonium nitrate, calcium nitrate, and urea, the mole ratio of ammonium nitrate to calcium nitrate is generally about 1 to about 3, often about 1.25 to about 2.5, and more often about 1.5 to about 2. Preferably, the mole ratio of ammonium nitrate to calcium nitrate is about 1.75±0.2, more preferably about 1.75±0.15, and even more preferably about 1.75±0.1. In addition, the mole ratio of urea to calcium nitrate is generally about 0.1 to about 5, often about 0.5 to about 4, more often about 1 to about 3, and most often about 1.2 to about 2.2. Preferably, the mole ratio of urea to calcium nitrate is about 1.7±0.4, more preferably about 1.7±0.3, and even more preferably about 1.7±0.2. The most preferred ammonium nitrate-, calcium nitrate-, and urea-containing quaternary aqueous solution has a mole ratio of ammonium nitrate to calcium nitrate of about 1.75± 0.05 and a mole ratio of urea to calcium nitrate of about 1.7±0.1.

The aqueous solutions of the present invention generally have a crystallization temperature of less than about 12.8° C. (55° F.), often less than about 12.2° C. (54° F.), more often less than about 11.7° C. (53° F.), even more often less than about 11.1° C. (52° F.), and most often less than about 10.6° C. (51° F.). In addition, the aqueous solutions commonly have a crystallization temperature greater than about −12.2° C. (10° F.), often greater than about −11.7° C. (11° F.), more often greater than about −11.1° C. (12° F.), and even more often greater than about −10.6° C. (13° F.).

For temperate climates, the aqueous solutions of the present invention usually have a crystallization temperature of about −10° C. to about −1.1° C. (14° F. to 30° F.). For example, the crystallization temperature of the aqueous solutions manufactured for use in temperate climates can be about −3.9° C. (25° F.) or about −5° C. (23° F.) or about −6.7° C. (20° F.) or about −9.4° C. (15° F.) or any other temperature within the approximate range of −10° C. to −1.1° C. (14° F. to 30° F.).

When formulated for use in tropical areas (e.g., Hawaii), the solutions of the present invention preferably have a crystallization temperature within the range of about −1.1° C. to about 10° C. (30° F. to 50° F.). The crystallization temperature of the solutions manufactured for use in tropical climates can be any temperature within the approximate −1.1° C. to 10° C. (30° F. to 50° F.) temperature range (e.g., 0° C. (32° F.) or about 1.7° C. (35° F.) or about 4.4° C. (40° F.) or about 5° C. (41° F.) or about 7.2° C. (45° F.)).

The compositions of the present invention generally contain at least about 5, often at least about 10, and more often at least about 15, weight percent total dissolved nitrogen. (As used in the specification and claims, the term "total dissolved nitrogen" means the concentration of nitrogen in the solution resulting from the solubilization of urea and the nitrate-containing compounds in the solution. When the term "total dissolved nitrogen" is employed in a more limited sense to mean the concentration of nitrogen in the solution resulting from the solubilization of urea, ammonium nitrate, and calcium nitrate, the term is qualified by the phrase "from urea, ammonium nitrate, and calcium nitrate.") The urea-, ammonium nitrate-, and calcium nitrate-containing quaternary aqueous solutions intended for use in temperate climates typically comprise at least about 16, more typically at least about 17, even more typically at least about 18, and most typically at least about 19, weight percent total dissolved nitrogen. Preferably, the urea-, ammonium nitrate-, and calcium nitrate-containing quaternary aqueous solutions manufactured for temperate climate usage comprise at least about 20, more preferably at least about 21, and most preferably about 22, weight percent total dissolved nitrogen. When manufactured for use in tropical areas, the urea-, ammonium nitrate-, and calcium nitrate-containing quaternary aqueous solutions preferably comprise at least about 22, more preferably at least about 23, even more preferably at least about 24, and most preferably about 25, weight percent total dissolved nitrogen.

The solutions of the present invention are also describable in terms of the concentrations of their various constituents. The following Table I sets forth approximate weight percents for quaternary solutions containing urea, ammonium nitrate, calcium nitrate, and water.

TABLE I

| Constituent Concentrations, Weight Percent | | | |
| --- | --- | --- | --- |
| Urea | Ammonium Nitrate | Calcium Nitrate | Water |
| 0.1—25 | ~20—~35 | ~25—40 | ≦~33 |
| ~10—25 | ~25 ± 5 | ~30 ± 5 | ~27 ± 5 |
| ~13—24 | ~25 ± 5 | ~30 ± 4 | ~27 ± 4 |
| ~15—22 | ~25 ± 3 | ~30 ± 3 | ~27 ± 3 |
| ~16—21 | ~25 ± 2 | ~30 ± 2 | ~27 ± 2 |
| ~17—20 | ~25 ± 1 | ~30 ± 1 | ~27 ± 1 |

Urea is present in the solutions of the present invention generally in a concentration of about 0.5 to about 25, often about 1 to about 24, more often about 2 to about 23, even more often about 3 to about 22, and most often about 4 to about 21, weight percent. Typically, the solutions of the present invention contain at least about 5, preferably at least about 6, more preferably at least about 7, even more preferably at least about 8, and most preferably at least about 9, weight percent urea.

The urea-, ammonium nitrate-, and calcium nitrate-containing aqueous solutions of the present invention commonly contain at least about 10, often at least about 11, more often at least about 12, even more often at least about 13, and most often at least about 14 weight percent urea. When such solutions are manufactured for use in temperate climates, they preferably contain at least about 15, more preferably at least about 16, and most preferably about 17, weight percent urea. When made for usage in tropical areas, the urea-, ammonium nitrate-, and calcium nitrate-containing aqueous solutions preferably comprise at least about 18, more preferably at least about 19, and most preferably about 20, weight percent urea.

An interesting aspect of the present invention is that the crystallization temperature of some, if not all, of the urea-, ammonium nitrate-, and calcium nitrate-containing aqueous solutions is less than the crystallization temperature of a comparative composition which compositionally differs from the solution solely in that the comparative composition is devoid of urea. (The mole ratios of the ingredients common to both the comparative composition and the solution are the same.) This phenomenon is unexpected because the crystallization temperature of an aqueous solution generally increases as an additional solute is added to the solution. Hence, the maximum solute concentration in a quaternary aqueous solution is usually less than the maximum solute concentration in a ternary aqueous solution composed of two of the solutes present in the quaternary solution. Accordingly, the present invention provides for the preparation of quaternary aqueous solutions having a higher nitrogen content than previously obtainable with ternary aqueous solutions containing ammonium nitrate and calcium nitrate in the same mole ratio-a very surprising result.

Optionally, one or more additives may be present in the solutions of this invention. Exemplary additives are other macronutrient-containing compounds and other micronutrient-containing compounds. (As used in the specification and claims, the term "macronutrient" means an element selected from the group consisting of oxygen, carbon, hydrogen, nitrogen, phosphorus, sulfur, potassium, calcium, and magnesium; and the term "micronutrient" means an element selected from the group consisting of iron, manganese, boron, zinc, copper, molybdenum, and chlorine.) Macronutrient-containing compounds and micronutrient-containing compounds are well known to those skilled in the art and need not be elaborated upon in detail. Suffice to say that all the macronutrient-containing compounds present in the composition of the present invention constitute generally less than about 25, and sometimes less than about 15 or about 10 or even about 5, weight percent, while all the micronutrient-containing compounds in the composition account for typically less than about 10, and often less than about 5 or about 1 or even about 0.5, weight percent.

While other macronutrient-containing compounds and micronutrient-containing compounds are optionally present, the composition of the present invention frequently contains less than about 5, more often less than about 3, and quite commonly less than about 1, weight percent of a compound or ingredient other than the nitrate-containing compounds, urea, and water. In fact, the preferred quaternary solution of the present invention often contains just ammonium nitrate, calcium nitrate, urea, and water, with trace impurities generally, but not necessarily, being present.

One method for preparing the solution of the present invention entails first mixing the nitrate-containing compounds and water. To this solution is then added urea. A surprising phenomenon occurs during the preparation of the urea-, ammonium nitrate-, and calcium nitrate-containing aqueous solutions, namely, urea readily dissolves in an ammonium nitrate- and calcium nitrate-containing aqueous solution at an ambient temperature. (As used in the specification and claims, the term "ambient temperature" means a temperature of about 20° C. (32° F.) to about 40° C. (104° F.).) The ambient temperature at which the urea is dissolved in the ammonium nitrate- and calcium nitrate-containing aqueous solution is generally less than about 35° C. (95° F.) and quite often less than about 30° C. (86° F.). In addition, urea is dissolved in the ammonium nitrate- and calcium nitrate-containing aqueous solution at an ambient temperature frequently greater than about 5° C. (41° F.), more commonly greater than about 10° C. (50° F.), and very frequently greater than about 15° C. (59° F.). Most frequently, the dissolution of urea in the ammonium nitrate- and calcium nitrate-containing aqueous solution takes place at a temperature of about 20° C. (68° F.) to about 25° C. (77° F.).

The easy dissolution of urea in an ammonia nitrate- and calcium nitrate-containing aqueous solution is unexpected because the dissolution of urea in water is highly endothermic-requiring the input of heat, in addition to that present in the ambient environment, to dissolve urea in water. In contrast to dissolving urea in only water, when urea is dissolved in an ammonium nitrate- and calcium nitrate-containing aqueous solution to form the preferred composition of the present invention, only a slight endotherm results. Hence, sufficient heat exists in the ambient environment for preparing the urea-, ammonium nitrate-, and calcium nitrate-containing aqueous solutions of the invention.

When employed, the optional additives are preferably added to the urea- and nitrate-containing aqueous solution.

The compositions of the present invention are applied to the soil, applied directly to plants, and/or introduced into irrigation water using techniques well known to those skilled in the art for handling liquid fertilizers. The aqueous compositions are suitable for application on any agricultural or horticulture crop, and are particularly desirable for use on vegetables (e.g., lettuce and celery) and potatoes as well as other vegetation susceptible to calcium deficiency-induced diseases. The application rate depends on the particular crop being treated, with most application rates falling within the range of about 5.6 to about 560 kilograms (kg) per hectare (5 to 500 pounds per acre) total nitrogen.

EXAMPLES

The following examples are intended to illustrate and not limit the invention. Example 1 demonstrates the decrease in crystallization temperature and the increase in solubility achievable by adding urea to an aqueous solution of ammonium nitrate and calcium nitrate. The increase in calcium uptake in the presence of urea is shown in Example 2.

EXAMPLE 1

Crystallization Temperature Depression, Increased Solubility

Incremental amounts of urea were added to a solution which initially comprised about 30.9 weight percent ammonium nitrate, about 36.2 weight percent calcium nitrate, and about 32.9 weight percent water. The mole ratio of ammonium nitrate to calcium nitrate in all the solutions employed in Example 1 was about 1.75. The temperature of each of the resulting solutions was lowered and the respective crystallization temperatures were noted and recorded. The results are set forth in the following Table A and plotted in the sole Figure.

TABLE A

Results Of Comparative Tests Demonstrating Crystallization Temperature Depression And Increased Solubility

| Comparative Test | Concentration, Weight Percent | | | | Total Nitrogen | $CO(NH_2)_2$ : $Ca(NO_3)_2$ [a] | Crystallization Temperature, °C. (°F.) |
|---|---|---|---|---|---|---|---|
| | Ammonium Nitrate | Calcium Nitrate | Urea | Water | | | |
| 1 (control) | 30.9 | 36.2 | 0 | 32.9 | 17 | 0 | −1.1 (30) |
| 2 | 29.4 | 34.4 | 5 | 31.3 | 18.5 | 0.40:1 | −5.6 (22) |
| 3 | 27.8 | 32.6 | 10 | 29.6 | 19.9 | 0.84:1 | −7.2 (19) |
| 4 | 27.2 | 31.9 | 12 | 29 | 20.5 | 1.03:1 | −7.8 (18) |
| 5 | 26.6 | 31.1 | 14 | 28.3 | 21.1 | 1.23:1 | −9.4 (15) |
| 6 | 26 | 30.4 | 16 | 27.6 | 21.6 | 1.44:1 | −10 (14) |
| 7 | 25.3 | 29.7 | 18 | 27 | 22.2 | 1.66:1 | 2.8 (37) |
| 8 | 24.7 | 29 | 20 | 26.3 | 22.8 | 1.88:1 | 10.6 (51) | a. Mole ratio of urea to calcium nitrate.

As set forth in Table A and graphically indicated in the Figure, when increasing amounts of urea are added to an ammonium nitrate- and calcium nitrate-containing aqueous solution initially devoid of urea, the crystallization temperature of the solution decreases until a minimum of about −10° C. (14° F.) is reached at an urea concentration of about 16 weight percent. The data listed in Table A and plotted in the Figure also indicate that the solute concentration in the solution increases (and, therefore, the water content of the solution decreases) as the urea concentration of the solution reaches about 17 weight percent (while maintaining the crystallization temperature of the solution at or below about −1.1° C. (30° F.)).

EXAMPLE 2

Increased Plant Uptake of Calcium

In another set of comparative experiments, leaves of growing mature SJ-1 cotton plants were dipped in about a 2 weight percent nitrogen solution containing the same calcium concentration (about 900 mg/l Ca). One of the nitrogen solutions (solution (a)) was a ternary aqueous solution containing a eutectic mole ratio of ammonium nitrate to calcium nitrate of about 1.75 and composed of about 30.9 weight percent ammonium nitrate, about 36.2 weight percent calcium nitrate, and about 32.9 weight percent water. The other nitrogen solution (solution (b)) was a quaternary aqueous solution comprising about 25.5 weight percent ammonium nitrate, about 30 weight percent calcium nitrate, about 17.2 weight percent urea, and about 27.3 weight percent water and having a mole ratio of about 1.75 moles of ammonium nitrate per mole of calcium nitrate and a mole ratio of about 2 moles of urea per mole of calcium nitrate. Each leaf was about 7 cm×10 cm.

For a control, four randomly selected leaves were dipped in the above solution (a) and another four randomly selected leaves were dipped in the above solution (b). After about 20 minutes, each of these eight leaves was rinsed with the same quantity of distilled water.

Another four randomly selected leaves were dipped in solution (a) and an additional four randomly selected leaves were dipped in solution (b). These latter eight leaves were then rinsed with distilled water about 24 hours after dipping. (The same quantity of distilled water was employed in both the 20 minute and the 24 hour experiments.)

The unassimilated calcium was determined by measuring the calcium content of the rinsate. The results of these measurements were recorded and are listed in the following Table B.

TABLE B

| Plant Calcium Uptake | | | |
| --- | --- | --- | --- |
| Control, mg Ca/l, 20 min. | | Treatment, mg Ca/l, 24 hrs. | |
| Solution (a) | Solution (b) | Solution (a) | Solution (b) |
| 11.2 | 9.6 | 6.2 | 4.3 |
| 9.5 | 11.3 | 7 | 4.6 |
| 12.1 | 9.8 | 5.9 | 5 |
| 11 | 12.5 | 6.8 | 3.9 |
| Ave.: 11 | Ave.: 10.8 | Ave.: 6.5 | Ave.: 4.4 |

Based upon the data set forth in Table B, the average calcium absorbed from solution (a) by the cotton leaf was about 41 percent, whereas the average calcium absorbed from an exemplary composition of the present invention, namely, solution (b), was about 59 percent. Accordingly, about 18 percent more calcium was absorbed from the urea-, ammonium nitrate-, and calcium nitrate-containing aqueous solution (b) than from solution (a), i.e., an ammonium nitrate- and calcium nitrate-containing aqueous solution devoid of urea.

Thus, the urea-, ammonium nitrate-, and calcium nitrate-containing aqueous solutions of the present invention provide for the production of a new nitrogen-calcium fertilizer having (a) an increased solids content (and, therefore, a reduced shipping, storage, and application cost because the fertilizer has a higher active ingredient content) and (b) an increased calcium nutrition efficiency (due to the enhancement of plant calcium uptake).

Although the present invention has been described in detail with reference to some preferred versions, other versions are possible. For example, in addition to calcium, urea can be employed in conjunction with other alkaline earth metals (e.g., magnesium) to increased plant uptake of such elements. Also, solutions designed to increase the uptake of alkaline earth metals need only contain urea, water, and an alkaline earth metal. (For example, a calcium nitrate- and urea-containing aqueous solution can be made by combining about 60.96 g $Ca(NO_3)_2 \cdot 4H_2O$, about 11.29 g urea, and about 27.74 g water to produce a clear liquid with a crystallization temperature of about 3.9° C. (39° F.).) Furthermore, while it is desirable from a cost perspective to simply dissolve urea in a nitrate-containing solution to form the composition of the present invention, heat can be used to expedite the dissolution of urea in the nitrate-containing solution. Therefore, the spirit and scope of the appended claims should not necessarily be limited to the description of the preferred versions contained herein.

What is claimed is:

1. A method comprising the step of fertilizing a plant by applying an aqueous solution to the soil and/or to at least one plant and/or by introducing the aqueous solution into irrigation water, where the aqueous solution comprises:

(a) about 1 to about 25 weight percent urea, (b) about 20 to about 35 weight percent ammonium nitrate, (c) about 25 to about 40 weight percent calcium nitrate, and (d) about 22 to about 33 weight percent water; and has:

(A) a mole ratio of ammonium nitrate to calcium nitrate of 1.5 to about 3, (B) a mole ratio of urea to calcium nitrate of about 0.1 to about 5, (C) a total dissolved nitrogen content from ammonium nitrate, calcium nitrate, and urea of at least 18 weight percent, and (D) a crystallization temperature of about −1.1° C. (30° F.) or less.

2. The method of claim 1 where the solution comprises about 10 to about 25 weight percent urea.

3. The method of claim 1 where the solution comprises about 20 to about 30 weight percent ammonium nitrate.

4. The method of claim 1 where the solution comprises about 25 to about 35 weight percent calcium nitrate.

5. The method of claim 1 where the solution comprises about 10 to about 25 weight percent urea, about to about 30 weight percent ammonium nitrate, about 25 to about 35 weight percent calcium nitrate, and less than about 32 weight percent water.

6. The method of claim 1 where the solution comprises about 13 to about 24 weight percent urea, about 21 to about 29 weight percent ammonium nitrate, about 26 to about 34 weight percent calcium nitrate, and less than about 31 weight percent water.

7. The method of claim 1 where the solution comprises about 15 to about 22 weight percent urea, about 22 to about 28 weight percent ammonium nitrate, about 27 to about 33 weight percent calcium nitrate, and less than about 30 weight percent water.

8. The method of claim 1 where the solution has a mole ratio of ammonium nitrate to calcium nitrate of 1.5 to about 2.5 and a mole ratio of urea to calcium nitrate of about 0.5 to about 4 moles.

9. The method of claim 1 where the solution has a total dissolved nitrogen content from ammonium nitrate, calcium nitrate, and urea of at least 19 weight percent.

10. The method of claim 1 where the solution has a total potassium-containing compound concentration of less than about 25 weight percent.

11. The method of claim 1 where the total concentration of ammonium nitrate and the nitrogen-containing compounds in the solution is about 50 to about 75 weight percent.

12. The method of claim 1 where the solution has a mole ratio of ammonium nitrate to calcium nitrate of 1.5 to about 2.5.

13. The method of claim 1 where the solution has a mole ratio of urea to calcium nitrate of about 0.5 to about 4 moles.

14. The method of claim 1 where the solution consists essentially of urea, ammonium nitrate, calcium nitrate, and water.

15. The method of claim 1 where the solution consists of urea, ammonium nitrate, calcium nitrate, and water.

* * * * *

UNITED STATES PATENT AND TRADEMARK OFFICE
CERTIFICATE OF CORRECTION

PATENT NO. : 5,494,498
DATED : February 27, 1996
INVENTOR(S) : Young

It is certified that error appears in the above-indentified patent and that said Letters Patent is hereby corrected as shown below:

```
Claim 5, column 8, line 46, after the word "about" (second
time) insert -- 20 --.
```

Signed and Sealed this

Twenty-third Day of July, 1996

Attest:

BRUCE LEHMAN

Attesting Officer

Commissioner of Patents and Trademarks